(12) United States Patent
Zhang

(10) Patent No.: US 11,689,465 B2
(45) Date of Patent: Jun. 27, 2023

(54) PACKET SCHEDULING METHOD, RELATED DEVICE, AND COMPUTER STORAGE MEDIUM

(71) Applicant: HUAWEI TECHNOLOGIES CO., LTD., Shenzhen (CN)

(72) Inventor: Yongping Zhang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 124 days.

(21) Appl. No.: 17/388,674

(22) Filed: Jul. 29, 2021

(65) Prior Publication Data
US 2021/0359949 A1    Nov. 18, 2021

Related U.S. Application Data

(63) Continuation of application No. PCT/CN2019/127827, filed on Dec. 24, 2019.

(30) Foreign Application Priority Data

Jan. 31, 2019 (CN) .......................... 201910104686.1

(51) Int. Cl.
*H04L 47/215* (2022.01)
*H04L 47/36* (2022.01)

(52) U.S. Cl.
CPC ............ *H04L 47/215* (2013.01); *H04L 47/36* (2013.01)

(58) Field of Classification Search
CPC ....... H04L 47/215; H04L 47/36; H04L 47/10; H04L 47/50; H04L 47/628; H04L 12/2814; H04L 2212/00; H04L 12/28
See application file for complete search history.

(56) References Cited

U.S. PATENT DOCUMENTS 7,010,607 B1    3/2006  Bunton
7,633,862 B2   12/2009  Nishimura
(Continued)

FOREIGN PATENT DOCUMENTS

CN    1852242 A    10/2006
CN    1889484 A     1/2007
(Continued)

OTHER PUBLICATIONS

International Search Report issued in corresponding International Application No. PCT/CN2019/127827, dated Mar. 16, 2020, pp. 1-10.
(Continued)

*Primary Examiner* — Jae Y Lee
(74) *Attorney, Agent, or Firm* — Hauptman Ham, LLP

(57) ABSTRACT

This application provides a packet scheduling method and a related device. The method includes: An access device receives a to-be-scheduled packet, and obtains an actual packet length of the to-be-scheduled packet; the access device determines a first compensation value and a second compensation value based on the to-be-scheduled packet, and determines a first packet length and a second packet length; and the access device schedules the to-be-scheduled packet based on the first packet length and the second packet length. By implementing the method in this application, the access device estimates a packet length of a packet received by each device on a packet forwarding path, and then schedules the packet based on the estimated packet length of the packet received by each device, so that the access device can manage bandwidth of each device on a network more accurately.

20 Claims, 5 Drawing Sheets

(56) References Cited

U.S. PATENT DOCUMENTS

| | | | |
|---|---|---|---|
| 2003/0179774 A1 | 9/2003 | Saidi et al. | |
| 2005/0152370 A1* | 7/2005 | Meehan | H04L 12/5601 370/393 |
| 2007/0195820 A1 | 8/2007 | So et al. | |
| 2008/0109559 A1* | 5/2008 | Chhabra | H04L 12/2859 709/238 |
| 2010/0085874 A1* | 4/2010 | Noy | H04L 47/215 370/230 |
| 2011/0075562 A1 | 3/2011 | Isaksson et al. | |
| 2018/0152934 A1 | 5/2018 | Wu et al. | |

FOREIGN PATENT DOCUMENTS

| | | |
|---|---|---|
| CN | 101447912 A | 6/2009 |
| CN | 101873634 A | 10/2010 |
| CN | 102843775 A | 12/2012 |
| CN | 103888372 A | 6/2014 |
| CN | 107896197 A | 4/2018 |
| CN | 109218215 A | 1/2019 |
| CN | 106605371 B | 1/2020 |
| JP | H09266485 A | 10/1997 |
| JP | H11261634 A | 9/1999 |
| JP | 2006262337 A | 9/2006 |
| JP | 2006333091 A | 12/2006 |
| JP | 2009512280 A | 3/2009 |
| JP | 2010518742 A | 5/2010 |
| JP | 2019517214 A | 6/2019 |
| WO | 2004107671 A1 | 12/2004 |
| WO | 2004109995 A1 | 12/2004 |

OTHER PUBLICATIONS

Chinese Office Action issued in corresponding Chinese Application No. 201910104686.1, dated Jul. 2, 2021, pp. 1-9.

K. Nishimura, A. Kitada, H. Tomonaga and T. Noguchi, "Proposal for ultra-high speed scheduling architecture," 2013 19th Asia-Pacific Conference on Communications (APCC), 2013, pp. 92-97, doi: 10.1109/APCC.2013.6765922.

Japanese Notice of Allowance issued in corresponding Japanese Application No. 2021-541488, dated Aug. 2, 2022, pp. 1-4.

Chinese Notice of Allowance issued in corresponding Chinese Application No. 201910104686.1, dated Jan. 21, 2022, pp. 1-4.

European Search Report issued in corresponding European Application No. 19913975.9, dated Feb. 16, 2022, pp. 1-13.

* cited by examiner

PACKET SCHEDULING METHOD, RELATED DEVICE, AND COMPUTER STORAGE MEDIUM

CROSS-REFERENCE TO RELATED APPLICATIONS

This application is a continuation of International Application No. PCT/CN2019/127827, filed on Dec. 24, 2019, which claims priority to Chinese Patent Application No. 201910104686.1, filed on Jan. 31, 2019. The disclosures of the aforementioned applications are hereby incorporated by reference in their entireties.

TECHNICAL FIELD

The present invention relates to the field of communications technologies, and in particular, to a packet scheduling method, a related device, and a computer storage medium.

BACKGROUND

With the development of telecommunication services, a network operator needs to analyze and manage network bandwidth in a more refined manner to improve network quality. In a common broadband access network, user equipment may be connected to an access device at an edge layer of a metropolitan area backbone network by using a network device, and the access device manages bandwidth of the user equipment and bandwidth of the network device. The network device may be a digital subscriber line access multiplexer (digital subscriber line access multiplexer, DSLAM), and the access device may be a broadband remote access server (broadband remote access server, BRAS).

Currently, when the access device manages the bandwidth of the user equipment and the bandwidth of the network device, after receiving a to-be-scheduled packet sent by a network side to the user equipment, the access device estimates only a packet length of a packet received by the user equipment, and then schedules the to-be-scheduled packet based on the estimated packet length of the packet received by the user equipment. However, in a packet transmission process, a length of a packet received by each device may be different. The access device schedules the to-be-scheduled packet only based on the estimated packet length of the to-be-scheduled packet received by the user equipment, to manage the bandwidth of the user equipment and the bandwidth of the network device. This can only ensure correctness of bandwidth management on the user equipment, but cannot ensure correctness of bandwidth management on another network device.

SUMMARY

Embodiments of the present invention disclose a packet scheduling method and apparatus, a related device, and a computer storage medium. An access device that performs bandwidth management estimates a packet length of a packet received by each device on a forwarding path of a to-be-scheduled packet, and then schedules the to-be-scheduled packet based on the estimated packet length of the packet received by each device, so that the access device can more accurately manage bandwidth of each device in a network.

According to a first aspect, an embodiment of this application discloses a packet scheduling method, including:

an access device receives a to-be-scheduled packet, where the to-be-scheduled packet is a packet sent by a network side to user equipment;

the access device obtains an actual packet length of the to-be-scheduled packet, where the actual packet length indicates a total length of the to-be-scheduled packet;

the access device determines a first compensation value and a second compensation value based on the to-be-scheduled packet, where the first compensation value indicates an estimate of a variation relative to the actual packet length after the to-be-scheduled packet is forwarded by a first network device, the second compensation value indicates an estimate of a variation relative to the actual packet length after the to-be-scheduled packet is forwarded by the access device, and the first network device is a network device located between the access device and the user equipment on a forwarding path of the to-be-scheduled packet;

the access device determines a first packet length and a second packet length, where a value of the first packet length is equal to a sum of a value of the actual packet length and the first compensation value, and a value of the second packet length is equal to a sum of the value of the actual packet length and the second compensation value; and the access device schedules the to-be-scheduled packet based on the first packet length and the second packet length.

Optionally, that the access device determines a first compensation value and a second compensation value based on the to-be-scheduled packet specifically includes:

the access device determines the forwarding path of the to-be-scheduled packet based on the to-be-scheduled packet, where the forwarding path includes an identifier of the access device and an identifier of the first network device; and the access device determines the first compensation value based on the identifier of the first network device, and determines the second compensation value based on the identifier of the access device.

Optionally, that the access device determines the first compensation value based on the identifier of the first network device, and determines the second compensation value based on the identifier of the access device specifically includes:

the access device determines a first compensation algorithm based on the identifier of the first network device, and determines a second compensation algorithm based on the identifier of the access device, where the first compensation algorithm is used to compensate for a packet length of a packet forwarded by the first network device, and the second compensation algorithm is used to compensate for a packet length of a packet forwarded by the access device; and the access device determines the first compensation value based on the actual packet length and the first compensation algorithm, and determines the second compensation value based on the actual packet length and the second compensation algorithm.

Optionally, that the access device schedules the to-be-scheduled packet based on the first packet length and the second packet length specifically includes:

the access device obtains a first quantity of remaining tokens in a first token bucket corresponding to the user equipment, where the first quantity of remaining tokens is equal to a quantity of tokens in the first token bucket at a current moment;

the access device obtains a second quantity of remaining tokens in a second token bucket corresponding to the first network device, where the second quantity of remaining tokens is equal to a quantity of tokens in the second token bucket at the current moment;

the access device determines a first quantity of target tokens used to schedule the to-be-scheduled packet based on the first token bucket and the first packet length, and a second quantity of target tokens used to schedule the to-be-scheduled packet based on the second token bucket and the second packet length;

the access device determines whether the first quantity of target tokens is less than or equal to the first quantity of remaining tokens, and whether the second quantity of target tokens is less than or equal to the second quantity of remaining tokens; and when the access device determines that the first quantity of target tokens is less than or equal to the first quantity of remaining tokens and the second quantity of target tokens is less than or equal to the second quantity of remaining tokens, the access device determines to forward the to-be-scheduled packet in a first period, deducts, from the first token bucket, tokens that are in a same quantity as the first quantity of target tokens, and deducts, from the second token bucket, tokens that are in a same quantity as the second quantity of target tokens.

Optionally, the method further includes: When the access device determines that the first quantity of target tokens is greater than the first quantity of remaining tokens, or the second quantity of target tokens is greater than the second quantity of remaining tokens, the access device determines not to forward the to-be-scheduled packet in the first period.

Optionally, access bandwidth of the user equipment is total bandwidth accessed to the user equipment, the access bandwidth of the user equipment includes first bandwidth, the first bandwidth is used to indicate bandwidth accessed to a target network service of the user equipment, a value of the first bandwidth is less than a value of the access bandwidth of the user equipment, and the method further includes:

the access device determines an identifier of the user equipment, and determines a third compensation value based on the identifier of the user equipment, where the third compensation value indicates an estimate of a variation relative to the actual packet length after the to-be-scheduled packet is distributed by the user equipment to the target network service; and that the access device schedules the to-be-scheduled packet based on the first packet length and the second packet length specifically includes:

the access device determines a third packet length based on the actual packet length and the third compensation value, where a value of the third packet length is equal to a sum of the value of the actual packet length and the third compensation value; and the access device schedules the to-be-scheduled packet based on the first packet length, the second packet length, and the third packet length.

Optionally, that the access device schedules the to-be-scheduled packet based on the first packet length, the second packet length, and the third packet length specifically includes:

the access device obtains a first quantity of remaining tokens in a first token bucket corresponding to the user equipment, where the first quantity of remaining tokens is equal to a quantity of tokens in the first token bucket at a current moment;

the access device obtains a second quantity of remaining tokens in a second token bucket corresponding to the first network device, where the second quantity of remaining tokens is equal to a quantity of tokens in the second token bucket at the current moment;

the access device obtains a third quantity of remaining tokens in a third token bucket corresponding to the target network service, where the third quantity of remaining tokens is equal to a quantity of tokens in the third token bucket at the current moment;

the access device determines a first quantity of target tokens used to schedule the to-be-scheduled packet based on the first token bucket and the first packet length, a second quantity of target tokens used to schedule the to-be-scheduled packet based on the second token bucket and the second packet length, and a third quantity of target tokens used to schedule the to-be-scheduled packet based on the third token bucket and the third packet length;

the access device determines whether the first quantity of target tokens is less than or equal to the first quantity of remaining tokens, whether the second quantity of target tokens is less than or equal to the second quantity of remaining tokens, and whether the third quantity of target tokens is less than or equal to the third quantity of remaining tokens; and when the access device determines that the first quantity of target tokens is less than or equal to the first quantity of remaining tokens, the second quantity of target tokens is less than or equal to the second quantity of remaining tokens, and the third quantity of target tokens is less than or equal to the third quantity of remaining tokens, the access device determines to forward the to-be-scheduled packet, deducts, from the first token bucket, tokens that are in a same quantity as the first quantity of target tokens, deducts, from the second token bucket, tokens that are in a same quantity as the second quantity of target tokens, and deducts, from the third token bucket, tokens that are in a same quantity as the third quantity of target tokens.

Optionally, the determining a third compensation value based on the identifier of the user equipment specifically includes:

the access device determines a third compensation algorithm based on the identifier of the user equipment, and determines the third compensation value based on the actual packet length and the third compensation algorithm.

Optionally, when the first network device is a network device that is based on an asynchronous transfer mode ATM, the first compensation value is equal to a length value of an ATM cell header times a quotient of the value of the actual packet length and a value of an ATM cell length.

Based on the packet scheduling method provided in this application, a compensation value or a compensation algorithm corresponding to each device whose bandwidth needs to be managed in a network may be configured, and the compensation value or the compensation algorithm may be stored in an access device that manages the bandwidth of each device. After receiving a to-be-scheduled packet, the access device first determines, based on a destination address of the to-be-scheduled packet, one or more network devices that the to-be-scheduled packet needs to pass through from the access device to the user equipment, and then searches for or calculates a compensation value corresponding to each network device in the one or more devices, to estimate a packet length of a to-be-scheduled packet received by each network device, and the access device determines, based on an estimated value of the packet length of the to-be-scheduled packet received by each network device and a quantity of tokens in a token bucket corresponding to each network device, whether to forward the to-be-scheduled packet. Packet length compensation is separately performed on each network device on a forwarding path of the to-be-scheduled packet, so that the access device can more accurately manage bandwidth of each network device.

According to a second aspect, an embodiment of this application discloses a packet compensation apparatus, and the apparatus includes:

a receiver, configured to receive a to-be-scheduled packet, where the to-be-scheduled packet is a packet sent by a network side to user equipment; and a processor, configured to obtain an actual packet length of the to-be-scheduled packet, where the actual packet length indicates a total length of the to-be-scheduled packet; where the processor is further configured to determine a first compensation value and a second compensation value based on the to-be-scheduled packet, where the first compensation value indicates an estimate of a variation relative to the actual packet length after the to-be-scheduled packet is forwarded by a first network device, the second compensation value indicates an estimate of a variation relative to the actual packet length after the to-be-scheduled packet is forwarded by the receiver, and the first network device is a network device located between the packet compensation apparatus and the user equipment on a forwarding path of the to-be-scheduled packet; and the processor is further configured to: determine a first packet length and a second packet length, where a value of the first packet length is equal to a sum of a value of the actual packet length and the first compensation value, and a value of the second packet length is equal to a sum of the value of the actual packet length and the second compensation value; and schedule the to-be-scheduled packet based on the first packet length and the second packet length.

Optionally, that the processor determines the first compensation value and the second compensation value based on the to-be-scheduled packet specifically includes:

the processor is configured to determine the forwarding path of the to-be-scheduled packet based on the to-be-scheduled packet, where the forwarding path includes an identifier of the packet compensation apparatus and an identifier of the first network device; and the processor is further configured to: determine the first compensation value based on the identifier of the first network device, and determine the second compensation value based on the identifier of the packet compensation apparatus.

Optionally, that the processor determines the first compensation value based on the identifier of the first network device, and determines the second compensation value based on the identifier of the packet compensation apparatus specifically includes:

the processor is configured to: determine a first compensation algorithm based on the identifier of the first network device, and determine a second compensation algorithm based on the identifier of the packet compensation apparatus, where the first compensation algorithm is used to compensate for a packet length of a packet forwarded by the first network device, and the second compensation algorithm is used to compensate for a packet length of a packet forwarded by the packet compensation apparatus; and the processor is further configured to: determine the first compensation value based on the actual packet length and the first compensation algorithm, and determine the second compensation value based on the actual packet length and the second compensation algorithm.

Optionally, that the processor schedules the to-be-scheduled packet based on the first packet length and the second packet length specifically includes:

the processor is configured to obtain a first quantity of remaining tokens in a first token bucket corresponding to the user equipment, where the first quantity of remaining tokens is equal to a quantity of tokens in the first token bucket at a current moment;

the processor is further configured to obtain a second quantity of remaining tokens in a second token bucket corresponding to the first network device, where the second quantity of remaining tokens is equal to a quantity of tokens in the second token bucket at the current moment;

the processor is further configured to determine a first quantity of target tokens used to schedule the to-be-scheduled packet based on the first token bucket and the first packet length, and a second quantity of target tokens used to schedule the to-be-scheduled packet based on the second token bucket and the second packet length;

the processor is further configured to determine whether the first quantity of target tokens is less than or equal to the first quantity of remaining tokens, and whether the second quantity of target tokens is less than or equal to the second quantity of remaining tokens; and when the processor determines that the first quantity of target tokens is less than or equal to the first quantity of remaining tokens and the second quantity of target tokens is less than or equal to the second quantity of remaining tokens, the processor is further configured to: determine to forward the to-be-scheduled packet in a first period, deduct, from the first token bucket, tokens that are in a same quantity as the first quantity of target tokens, and deduct, from the second token bucket, tokens that are in a same quantity as the second quantity of target tokens.

Optionally, when the processor determines that the first quantity of target tokens is greater than the first quantity of remaining tokens, or the second quantity of target tokens is greater than the second quantity of remaining tokens, the processor is further configured to determine not to forward the to-be-scheduled packet in the first period.

Optionally, access bandwidth of the user equipment is total bandwidth accessed to the user equipment, the access bandwidth of the user equipment includes first bandwidth, the first bandwidth is used to indicate bandwidth accessed to a target network service of the user equipment, a value of the first bandwidth is less than a value of the access bandwidth of the user equipment;

the processor is further configured to: determine an identifier of the user equipment, and determine a third compensation value based on the identifier of the user equipment, where the third compensation value indicates an estimate of a variation relative to the actual packet length after the to-be-scheduled packet is distributed by the user equipment to the target network service; and that the processor schedules the to-be-scheduled packet based on the first packet length and the second packet length specifically includes:
the processor is configured to determine a third packet length based on the actual packet length and the third compensation value, where a value of the third packet length is equal to a sum of the value of the actual packet length and the third compensation value; and the processor is configured to schedule the to-be-scheduled packet based on the first packet length, the second packet length, and the third packet length.

Optionally, that the processor schedules the to-be-scheduled packet based on the first packet length, the second packet length, and the third packet length specifically includes:
the processor is configured to obtain a first quantity of remaining tokens in a first token bucket corresponding to the user equipment, where the first quantity of remaining tokens is equal to a quantity of tokens in the first token bucket at a current moment;
the processor is further configured to obtain a second quantity of remaining tokens in a second token bucket corresponding to the first network device, where the second quantity of remaining tokens is equal to a quantity of tokens in the second token bucket at the current moment;
the processor is further configured to obtain a third quantity of remaining tokens in a third token bucket corresponding to the target network service, where the third quantity of remaining tokens is equal to a quantity of tokens in the third token bucket at the current moment;
the processor is further configured to determine a first quantity of target tokens used to schedule the to-be-scheduled packet based on the first token bucket and the first packet length, a second quantity of target tokens used to schedule the to-be-scheduled packet based on the second token bucket and the second packet length, and a third quantity of target tokens used to schedule the to-be-scheduled packet based on the third token bucket and the third packet length;
the processor is further configured to determine whether the first quantity of target tokens is less than or equal to the first quantity of remaining tokens, whether the second quantity of target tokens is less than or equal to the second quantity of remaining tokens, and whether the third quantity of target tokens is less than or equal to the third quantity of remaining tokens; and
when the processor determines that the first quantity of target tokens is less than or equal to the first quantity of remaining tokens, the second quantity of target tokens is less than or equal to the second quantity of remaining tokens, and the third quantity of target tokens is less than or equal to the third quantity of remaining tokens, the processor is further configured to: determine to forward the to-be-scheduled packet, deduct, from the first token bucket, tokens that are in a same quantity as the first quantity of target tokens, deduct, from the second token bucket, tokens that are in a same quantity as the second quantity of target tokens, and deduct, from the third token bucket, tokens that are in a same quantity as the third quantity of target tokens.

Optionally, the processor is further configured to: determine a third compensation algorithm based on the identifier of the user equipment, and determine the third compensation value based on the actual packet length and the third compensation algorithm.

Optionally, when the first network device is a network device that is based on an asynchronous transfer mode ATM, the first compensation value is equal to a length value of an ATM cell header times a quotient of the value of the actual packet length and a value of an ATM cell length.

According to a third aspect, an embodiment of this application provides a network device including a processor, a communications interface, and a memory. The memory is configured to store an instruction, the processor is configured to execute the instruction, and the communications interface is configured to receive or send data. When executing the instruction, the processor performs the method described in the first aspect or any possible implementation of the first aspect.

According to a fourth aspect, this application provides a non-transient computer storage medium, the non-transient computer storage medium stores a computer program used for packet scheduling, and when the computer program is executed by a processor, the method described in the first aspect or any possible implementation of the first aspect is implemented.

BRIEF DESCRIPTION OF DRAWINGS

To describe the technical solutions in the embodiments of the present invention more clearly, the following briefly describes the accompanying drawings for describing the embodiments. Apparently, the accompanying drawings in the following description show a part of embodiments of the present invention, and a person of ordinary skill in the art may still derive other drawings from these accompanying drawings without creative efforts.

DESCRIPTION OF EMBODIMENTS

The following describes the embodiments of this application with reference to accompanying drawings.

Figure 1:
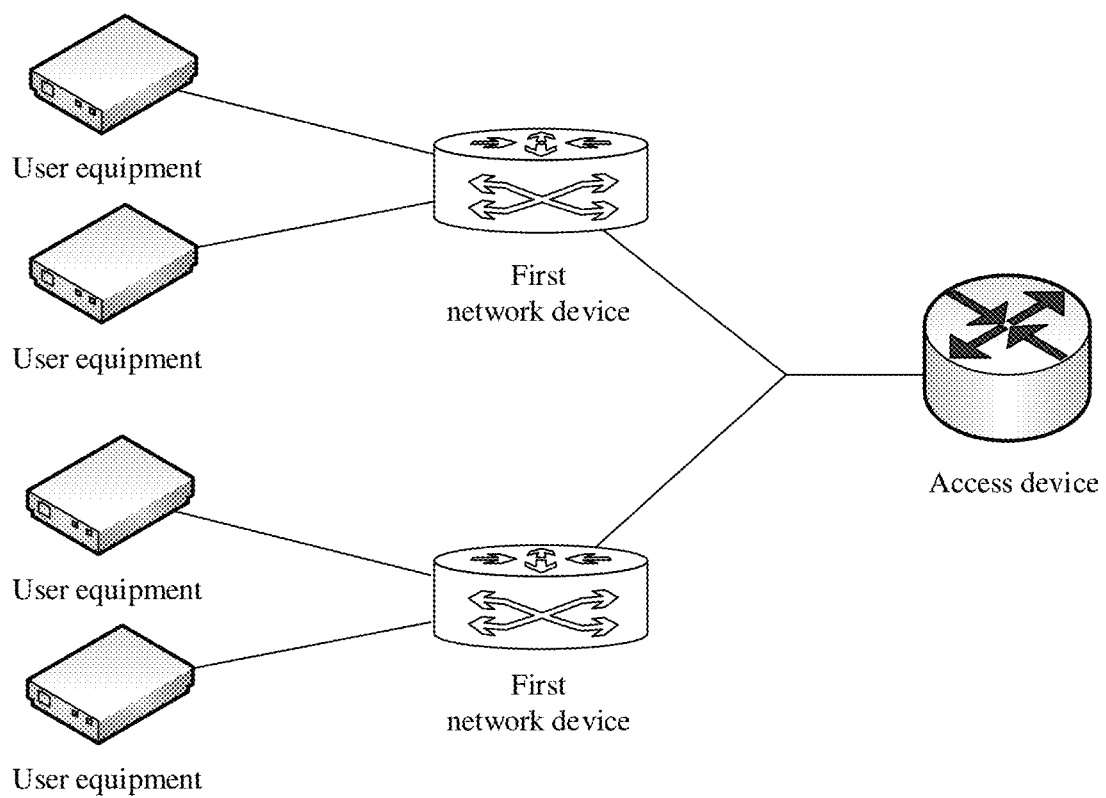
FIG. 1 is a schematic structural diagram of a broadband access network according to an embodiment of this application.

Bandwidth is an amount of data that can pass through a link within unit time, and a unit is bit per second (bit/s) and is usually represented by megabit per second (Mbps). During actual network bandwidth management, traffic of a user may be limited to preset bandwidth, and to determine whether traffic of a network device exceeds rated bandwidth, a token bucket algorithm needs to be used for calculation. A token bucket algorithm mechanism is described below: FIG. 1 is a schematic structural diagram of a broadband access network. User equipment is connected to an access device by using a first network device. The access device is an access gateway of the broadband network, is located at an edge layer of a backbone network, can connect a broadband access network device to a backbone network, and manage bandwidth of the access network device. The access device includes a token bucket corresponding to each of one or more devices whose bandwidth needs to be managed by the access device, and one token in each token bucket allows an interface of a corresponding device to send or receive data of one bit or data of one byte. In this embodiment of this application, that one token allows an interface to receive data of one byte is used as an example for description. When an interface of a device needs to receive data of one byte, one token needs to be removed from a token bucket corresponding to the device. If a quantity of tokens in the token bucket corresponding to the device is less than a quantity of tokens that need to be removed by the device to receive data, bandwidth of the device exceeds access bandwidth of the device if the device receives the data. If one token allows an interface to receive data of one byte, a value of the access bandwidth of the device is equal to 8 times a quantity of tokens injected into the token bucket corresponding to the device every second.

Specifically, for example, the access device performs bandwidth management on access bandwidth of the user equipment. The access device includes a first token bucket corresponding to the user equipment and a second token bucket corresponding to the first network device. When receiving a to-be-scheduled packet sent by a network side to the user equipment, the access device obtains an actual packet length of the to-be-scheduled packet, determines a first quantity of target tokens that need to be used to forward the to-be-scheduled packet based on the first token bucket and the actual packet length, and then obtains a first quantity of remaining tokens in the first token bucket. If the first quantity of target tokens is less than or equal to the first quantity of remaining tokens in the first token bucket, it indicates that actual bandwidth of the user equipment does not exceed the access bandwidth of the user equipment when the user equipment receives the to-be-scheduled packet, and when forwarding the to-be-scheduled packet, the access device deducts, from the first token bucket, a quantity of tokens that need to be consumed to send the actual packet length. It may be understood that a token cannot only be removed from the token bucket, but can also be added to the token bucket, and the access bandwidth of the user equipment is controlled by controlling a rate of adding a token to the token bucket. For example, the access bandwidth of the user equipment is 8000 bits/s. If it is ensured that 1000 tokens are added to the first token bucket corresponding to the user equipment every second, and a maximum quantity of tokens in the first token bucket corresponding to the user equipment does not exceed 1000, it can be ensured that the actual bandwidth of the user equipment does not exceed the access bandwidth of the user equipment.

In the foregoing example, the access device determines, based on the actual packet length of the to-be-scheduled packet received by the access device, a first quantity of target tokens that need to be deducted from the first token bucket when forwarding the to-be-scheduled packet. For example, if the actual packet length is 240 bytes, the access device deducts 240 tokens from the first token bucket when forwarding the to-be-scheduled packet. However, in a packet transmission process, different devices perform different processing on the packet based on a network protocol, thereby causing a change of a packet length. For example, in the network shown in FIG. 1, if the access bandwidth of the user equipment is 8000 bits/s, the first network device is a digital subscriber line access multiplexer (digital subscriber line access multiplexer, DSLAM), and the DSLAM uses an asynchronous transfer mode (asynchronous transfer mode, ATM), when the to-be-scheduled packet is transmitted to the DSLAM, the DSLAM segments the to-be-scheduled packet into five 48-byte ATM cells, and then encapsulates a cell header whose length is 5 bytes into each ATM cell to obtain a 53-byte cell. After the foregoing 240-byte packet passes through the DSLAM, 240×5/48=25 bytes are added. After the 240-byte to-be-scheduled packet is forwarded by the DSLAM, a packet length of the to-be-scheduled packet received by the user equipment is 265 bytes. Bandwidth of the user equipment is measured based on an amount of data received by the user equipment. If the access device forwards data of 8000 bits (in other words, 1000 bytes) every second based on the access bandwidth corresponding to the user equipment, data actually received by the user equipment every second exceeds 8000 bits, and the actual bandwidth corresponding to the user equipment exceeds the access bandwidth of the user equipment.

To resolve the foregoing problem, when forwarding the received to-be-scheduled packet, the access device compensates for the actual packet length of the to-be-scheduled packet, to obtain a scheduling length of the to-be-scheduled packet. The scheduling length is a packet length considered by the access device when the user equipment receives the to-be-scheduled packet, to be specific, the access device adds or subtracts a specific byte length based on a value of the actual packet length of the received to-be-scheduled packet. The access device determines, based on the scheduling length and a quantity of tokens in the first token bucket, whether to forward the to-be-scheduled packet, and when determining to forward the to-be-scheduled packet, determines the first quantity of target tokens that need to be removed from the first token bucket. In this embodiment of this application, a value of the added or subtracted byte length is referred to as a compensation value. When forwarding the to-be-scheduled packet, the access device removes, based on the scheduling length corresponding to the user equipment, a token from the first token bucket corresponding to the user equipment, to prevent the actual bandwidth of the user equipment from exceeding the access bandwidth. For example, in the foregoing example, after the access device receives the to-be-scheduled packet whose length is 240 bytes and that needs to be forwarded to the user equipment, the access device compensates for 25 bytes based on the actual packet length of the to-be-scheduled packet, and uses 265 bytes as the scheduling length corresponding to the user equipment. When forwarding the to-be-scheduled packet, the access device removes tokens corresponding to the 265 bytes from the first token bucket. In this way, it can be ensured that data sent by the access device every second is less than 8000 bits, and data received by the user equipment is prevented from being greater than 8000 bits, thereby managing the access bandwidth of the user equipment. It should be noted that compensation performed by the access device on a first packet length of the received to-be-scheduled packet does not change the to-be-scheduled packet or the actual packet length of the to-be-scheduled packet. The compensation value is only used by the access device to obtain, based on the received first packet length and the compensation value, the scheduling length corresponding to the user equipment, and the actual packet length of the to-be-scheduled packet does not change. When scheduling the to-be-scheduled packet, the access device schedules, based on the scheduling length, a packet whose actual packet length is 240 bytes as a 265-byte packet, so that 265 tokens can be removed from the first token bucket corresponding to the user equipment.

Currently, when performing hierarchical bandwidth management on the network, the access device can only perform unified packet compensation on received to-be-scheduled packets. After determining a compensation value corresponding to the user equipment, the access device uses the compensation value corresponding to the user equipment as a compensation value of another device that is located between the access device and the user equipment on a forwarding path of the to-be-scheduled packet. In other words, during bandwidth management of the another device that is located between the access device and the user equipment on the forwarding path of the to-be-scheduled packet, bandwidth of the another device is managed uniformly based on the scheduling length corresponding to the user equipment. For example, when the access device receives the 240-byte to-be-scheduled packet, the access device compensates 25 bytes for a packet length of the to-be-scheduled packet when scheduling the to-be-scheduled packet based on the first token bucket corresponding to the user equipment, and when managing bandwidth of the first network device, the access device also sets a scheduling length of the first network device to 265 bytes. In this case, when forwarding the to-be-scheduled packet, the access device removes 265 tokens from each of the first token bucket corresponding to the user equipment and the second token bucket corresponding to the first network device.

However, in a hierarchical bandwidth management system of the network, different devices between the access device and the user equipment have different bandwidth requirements. Therefore, packet lengths of the different devices between the access device and the user equipment need to be separately compensated for during hierarchical bandwidth management. However, in the prior art, only unified compensation can be performed on the different devices, and therefore, a requirement of separately managing bandwidth of the different devices in the network cannot be met. For example, in the scenario shown in FIG. 1, to ensure correctness of bandwidth of the user equipment, the first network device can only be compensated for based on the compensation value corresponding to the user equipment. Consequently, bandwidth management on the first network device is inaccurate, and bandwidth of the first network device exceeds access bandwidth of the first network device or bandwidth utilization of the first network device is reduced. For example, in an actual network, a packet length of the to-be-scheduled packet forwarded by the access device and received by the first network device is not 265 bytes, but is 254 bytes. When forwarding the to-be-scheduled packet, the access device removes 265 tokens from the second token bucket corresponding to the first network device. A quantity of tokens removed by the access device from the second token bucket is greater than a value of a packet length of the to-be-scheduled packet actually received by the first network device. If the access bandwidth of the first network device is 100 Mbps, and 265 tokens are removed from the second token bucket when the first network device receives data of 254 bytes, a maximum amount of data that can be received by the first network device in one second is less than 100 Mbits, and consequently, link bandwidth utilization between the access device and the first network device is reduced, and the actual bandwidth of the first network device is less than the access bandwidth of the first network device. It may be understood that, in the actual network, if the length of the to-be-scheduled packet actually received by the first network device is greater than 265 bytes, and the access device removes 265 tokens from the second token bucket still by using 265 bytes as the scheduling length of the first network device, a quantity of tokens removed by the access device from the second token bucket is less than a quantity of tokens that actually need to be consumed when the first network device receives the data, and consequently, data that can be received by using tokens corresponding to 100 Mbits is greater than 1000 Mbits, and the actual bandwidth of the first network device is greater than the access bandwidth of the first network device. Based on the foregoing analysis, in the prior art, a compensation value that is set to ensure correctness of the bandwidth of the user equipment is used as a compensation value of another device between the access device and the user equipment, and consequently, actual bandwidth of the another device is less than or exceeds access bandwidth of the corresponding device, causing inaccurate bandwidth management.

To resolve the foregoing problem, this application provides a packet scheduling method. The access device can determine a forwarding path of a received to-be-scheduled packet, obtain a compensation value corresponding to each device on the forwarding path, determine, based on the compensation value corresponding to each device and an actual packet length of the to-be-scheduled packet received by the access device, a scheduling length corresponding to each device, and finally schedule the to-be-scheduled packet based on the scheduling length corresponding to each device on the forwarding path.

Figure 2:
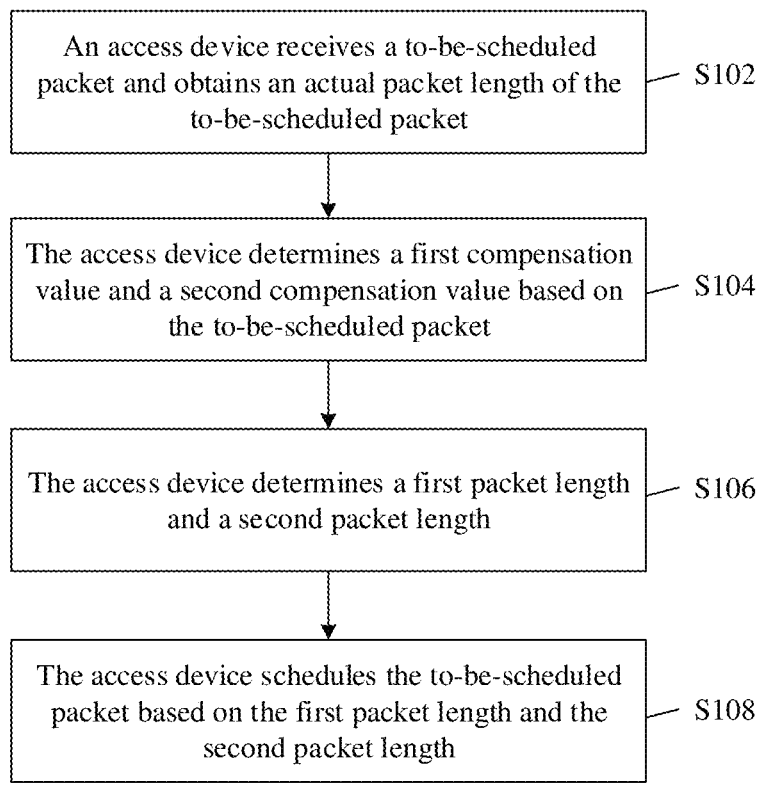
FIG. 2 is a schematic flowchart of a packet scheduling method according to an embodiment of this application.

FIG. 2 is a schematic flowchart of a packet scheduling method according to an embodiment of this application. The method includes the following steps.

S102: An access device receives a to-be-scheduled packet, and obtains an actual packet length of the to-be-scheduled packet.

In this embodiment of this application, the to-be-scheduled packet is a packet sent by a network side to user equipment. After receiving the to-be-scheduled packet sent by the network side, the access device needs to obtain the actual packet length of the to-be-scheduled packet. The actual packet length indicates a total length of the to-be-scheduled packet, in other words, the actual packet length includes a length of user data and a length of a packet header.

S104: The access device determines a first compensation value and a second compensation value based on the to-be-scheduled packet.

In this embodiment of this application, the packet scheduling method is described still by using the scenario shown in FIG. 1. The first compensation value indicates an estimate of a variation relative to the actual packet length after the to-be-scheduled packet is forwarded by a first network device, the second compensation value indicates an estimate of a variation relative to the actual packet length after the to-be-scheduled packet is forwarded by the access device, and the first network device is a network device located between the access device and the user equipment on a forwarding path of the to-be-scheduled packet. After the to-be-scheduled packet is forwarded by the first network device, the to-be-scheduled packet is received by the user equipment, and therefore, the first compensation value is an estimated value of a difference between a length of a first scheduling packet received by the user equipment and the actual packet length, and the second compensation value is an estimated value of a difference between a length of a second scheduling packet received by the first network device and the actual packet length. For example, the actual packet length of the to-be-scheduled packet received by the access device is 240 bytes, and the access device determines that a DSLAM is connected to the user equipment on the forwarding path of the to-be-scheduled packet. In this case, the access device determines, through estimation based on the actual packet length and a packet processing manner of the DSLAM, that a packet length obtained after the to-be-scheduled packet is processed by the DSLAM increases by 25 bytes, and the access device uses 25 as the first compensation value.

It should be noted that, in this embodiment of this application, the access device cannot directly obtain a packet length of the first scheduling packet received by the user equipment and a packet length of the second scheduling packet received by the first network device, and can estimate, only by obtaining the first compensation value and the second compensation value, the packet lengths of the packets received by the user equipment and the first network device.

In this embodiment of this application, the access device stores compensation values corresponding to various device identifiers in a bandwidth management system or compensation algorithms for calculating the compensation values. After receiving the to-be-scheduled packet, the access device obtains, based on the received to-be-scheduled packet, a forwarding path for forwarding the to-be-scheduled packet to the user equipment, where the forwarding path includes an identifier of the access device and an identifier of the first network device, and then determines the first compensation value based on the identifier of the first network device and determines the second compensation value based on the identifier of the access device. It should be noted that, a compensation value determined based on an identifier of a device in a network is a compensation value required when bandwidth of a device that is at a next level of the device on the forwarding path is managed. For example, the first compensation value determined based on the identifier of the first network device is a compensation value required when bandwidth of the user equipment is managed, and the second compensation value determined based on the identifier of the access device is a compensation value required when bandwidth of the first network device is managed.

Specifically, the identifier of the first network device may correspond to a specific compensation value, or may correspond to a compensation algorithm, and the identifier of the access device may correspond to a specific compensation value, or may correspond to a compensation algorithm. If the identifier of the first network device corresponds to a specific compensation value, the access device directly uses the compensation value as the first compensation value. If the identifier of the access device corresponds to a specific compensation value, the access device directly uses the compensation value as the second compensation value. If the identifier of the access device and/or the identifier of the first network device correspond to a compensation algorithm, the access device calculates a compensation value based on the compensation algorithm.

Figure 3:
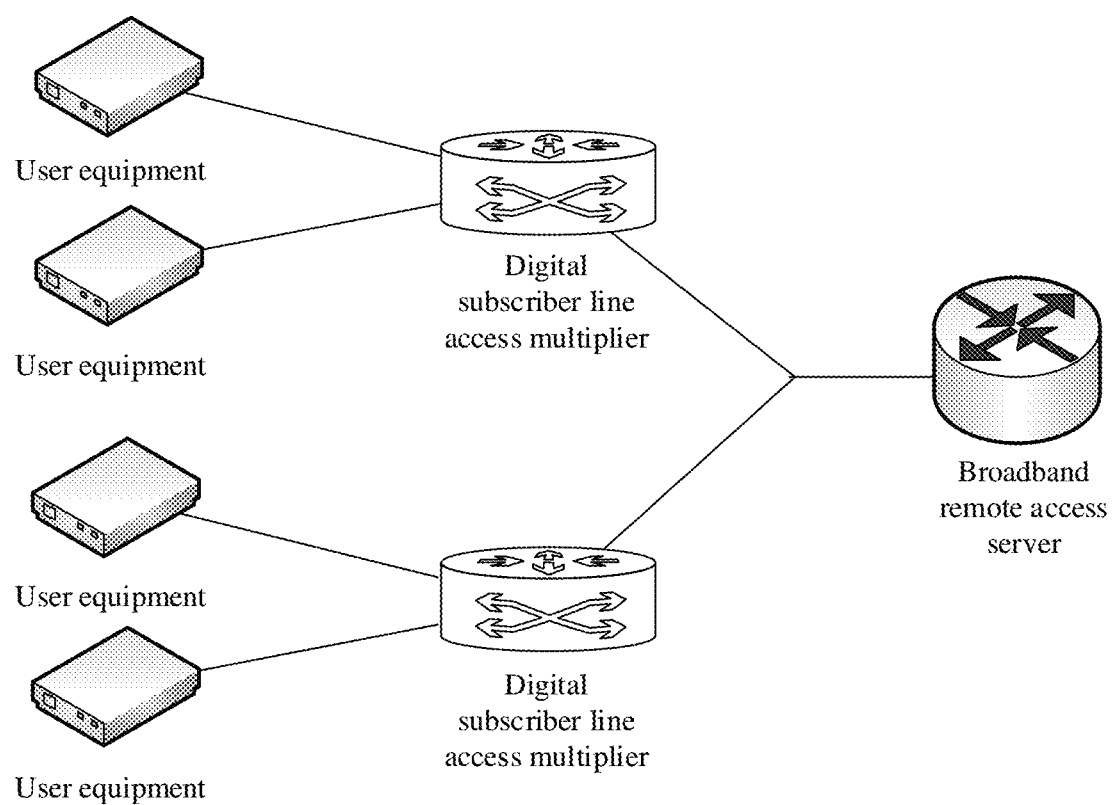
FIG. 3 is a schematic structural diagram of a broadband access network according to an embodiment of this application.

For example, FIG. 3 is a schematic diagram of a broadband access network that uses an asymmetric digital subscriber line (asymmetric digital subscriber line, ADSL). In a scenario shown in FIG. 3, the access device may be a broadband remote access server (broadband remote access server, BRAS), the first network device may be a DSLAM, and the DSLAM uses an asynchronous transfer mode in an ADSL access network. After receiving the 240-byte to-be-scheduled packet, the access device determines that the to-be-scheduled packet passes through the first network device and the access device when being transmitted from the access device to the user equipment, and the access device determines, based on an identifier of the DSLAM, that the DSLAM corresponds to a compensation algorithm. The compensation algorithm corresponding to the DSLAM is: Actual packet length×5/ATM cell length. If the actual packet length is 240 bytes and the ATM cell length is 48 bytes, the first compensation value determined based on the identifier of the first network device is 25. For a principle of the compensation algorithm, refer to the foregoing example. Details are not described herein. The BRAS uses an Ethernet transmission protocol. Before forwarding the to-be-scheduled packet, the BRAS encapsulates a 20-byte interframe gap and a 14-byte Ethernet frame header into the to-be-scheduled packet. The 20-byte interframe gap does not consume a token during transmission. Therefore, for the first network device, a length of a to-be-scheduled packet forwarded by the BRAS and received by the first network device is 254 bytes, and a compensation value corresponding to the first network device is 14, in other words, a specific compensation value 14 is determined based on the identifier of the access device. In this case, 14 is used as the second compensation value.

S106: The access device determines a first packet length and the second packet length.

The first packet length is obtained after the access device estimates, based on the actual packet length and the first compensation value, the packet length of the first scheduling packet received by the user equipment, and a value of the first packet length is equal to a sum of a value of the actual packet length and the first compensation value. The second packet length is obtained after the access device estimates, based on the actual packet length and the second compensation value, the packet length of the second scheduling packet received by the first network device, and a value of the second packet length is equal to a sum of the value of the actual packet length and the second compensation value. For example, in the example of step S104, the actual packet length of the to-be-scheduled packet received by the access device is 240 bytes, the first compensation value is 25, and the second compensation value is 14. In this case, the first packet length is 265 bytes, and the second packet length is 254 bytes.

S108: The access device schedules the to-be-scheduled packet based on the first packet length and the second packet length.

In this embodiment of this application, that the access device schedules the to-be-scheduled packet means that the access device determines, based on the first packet length, a first quantity of remaining tokens in the first token bucket, the second packet length, and a second quantity of remaining tokens in the second token bucket, whether to forward the to-be-scheduled packet.

Specifically, the access device first determines, based on the first packet length, that a first quantity of target tokens in the first token bucket need to be consumed to forward the to-be-scheduled packet, and determines, based on the second packet length, that a second quantity of target tokens in the second token bucket need to be consumed to forward the to-be-scheduled packet. For example, if the first packet length is 265 bytes and the second packet length is 254 bytes, the access device determines that 265 tokens in the first token bucket and 254 tokens in the second token bucket need to be consumed by the access device to forward the to-be-scheduled packet.

Then, the access device obtains the first quantity of remaining tokens in the first token bucket and the second quantity of remaining tokens in the second token bucket. The first quantity of remaining tokens is equal to a quantity of tokens in the first token bucket at a current moment, and the second quantity of remaining tokens is equal to a quantity of tokens in the second token bucket at the current moment.

Finally, the access device determines whether the first quantity of target tokens is less than or equal to the first quantity of remaining tokens, and whether the second quantity of target tokens is less than or equal to the second quantity of remaining tokens. When the access device determines that the first quantity of target tokens is less than or equal to the first quantity of remaining tokens and the second quantity of target tokens is less than or equal to the second quantity of remaining tokens, the access device determines to forward the to-be-scheduled packet in a first period, deducts, from the first token bucket, tokens that are in a same quantity as the first quantity of target tokens, and deducts, from the second token bucket, tokens that are in a same quantity as the second quantity of target tokens. When the access device determines that the first quantity of target tokens is greater than the first quantity of remaining tokens or the second quantity of target tokens is greater than the second quantity of remaining tokens, the access device determines not to forward the to-be-scheduled packet in the first period.

Based on the packet scheduling method provided in this application, a compensation value or a compensation algorithm corresponding to each device whose bandwidth needs to be managed in the network may be configured, and a correspondence between a device identifier of each device and the compensation value or the compensation algorithm may be stored in an access device that manages the bandwidth of each device. After receiving a to-be-scheduled packet, the access device first determines, based on a destination address of the to-be-scheduled packet, one or more network devices that the to-be-scheduled packet needs to pass through from the access device to the user equipment, and then searches for or calculates a compensation value corresponding to each network device in the one or more devices, to estimate a packet length of a to-be-scheduled packet received by each network device, and the access device determines, based on an estimated value of the packet length of the to-be-scheduled packet received by each network device and a quantity of tokens in a token bucket corresponding to each network device, whether to forward the to-be-scheduled packet. Packet length compensation is separately performed on each network device on a forwarding path of the to-be-scheduled packet, so that the access device can more accurately manage bandwidth of each network device.

In this embodiment of this application, when bandwidth management is performed on access bandwidth of the user equipment, the access bandwidth of the user equipment is total bandwidth accessed to the user equipment, and the total bandwidth is total bandwidth of a plurality of network services such as a voice service and a video service that are subscribed to by a user. The access bandwidth of the user equipment includes first bandwidth, the first bandwidth is used to indicate bandwidth of a target network service accessed to the user equipment, and a value of the first bandwidth is less than a value of the access bandwidth of the user equipment. All to-be-scheduled packets received by the access device are packets of a target network service of the user. Therefore, after receiving the to-be-scheduled packet, the access device further needs to manage bandwidth of the target network service. In addition to determining the first compensation value and the second compensation value, determining the first packet length based on the first compensation value and the actual packet length, and determining the second compensation value based on the second compensation value and the actual packet length, the access device further needs to determine an identifier of the user equipment, and determine a third compensation value based on the identifier of the user equipment. The third compensation value indicates an estimate of a variation relative to the actual packet length after the to-be-scheduled packet is distributed by the user equipment to the target network service. Then, the access device determines a third packet length based on the actual packet length and the third compensation value, and a value of the third packet length is equal to a sum of the value of the actual packet length and the third compensation value. Then, the access device determines a third quantity of remaining tokens in a third token bucket corresponding to the target network service, and a third quantity of target tokens used when the to-be-scheduled packet is scheduled based on the third token bucket and the third packet length. The third quantity of remaining tokens is equal to a quantity of tokens in the third token bucket at the current moment. Finally, when the access device determines that the first quantity of target tokens is less than or equal to the first quantity of remaining tokens, the second quantity of target tokens is less than or equal to the second quantity of remaining tokens, and the third quantity of target tokens is less than or equal to the third quantity of remaining tokens, the access device determines to forward the to-be-scheduled packet, deducts, from the first token bucket, tokens that are in a same quantity as the first quantity of target tokens, deducts, from the second token bucket, tokens that are in a same quantity as the second quantity of target tokens, and deducts, from the third token bucket, tokens that are in a same quantity as the third quantity of target tokens.

Figure 4:
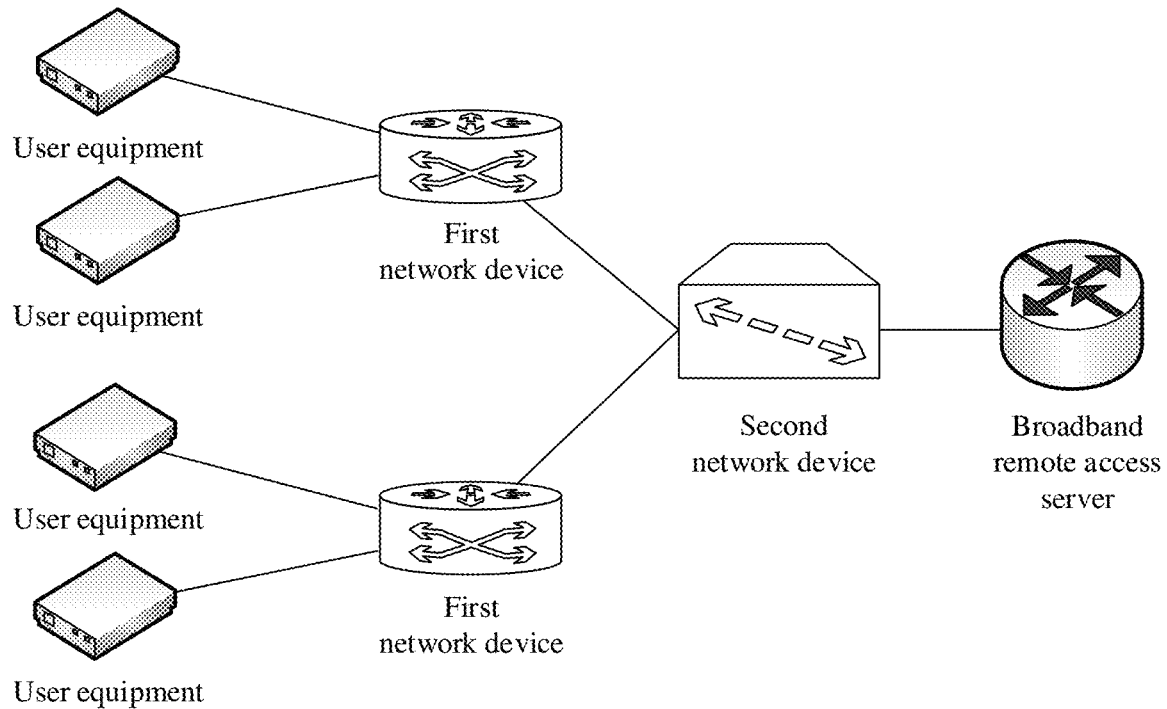
FIG. 4 is a schematic structural diagram of another broadband access network according to an embodiment of this application.

In a possible implementation, FIG. 4 is a schematic diagram of a broadband access network that uses optical fiber access. In FIG. 4, user equipment is connected to a first network device, the first network device is connected to a second network device, and the second network device is connected to an access device. Therefore, in an optical fiber access network shown in FIG. 4, after receiving a to-be-scheduled packet that needs to be forwarded to the user equipment, the access device needs to determine the first compensation value based on an identifier of the first network device, determine a second compensation value based on an identifier of the access device, determine a third compensation value based on an identifier of the user equipment, and determine a fourth compensation value based on an identifier of the second network device. The first compensation value indicates an estimate of a variation, relative to the actual packet length, of a packet length of a first scheduling packet received by the user equipment after the to-be-scheduled packet is forwarded by the first network device, the second compensation value indicates an estimate of a variation, relative to the actual packet length, of a packet length of a second scheduling packet received by the second network device after the to-be-scheduled packet is forwarded by the access device, the third compensation value indicates an estimate of a variation, relative to the actual packet length, of a packet length of a third scheduling packet obtained when the to-be-scheduled packet is distributed by the user equipment to the target networks service, and the fourth compensation value indicates an estimate of a variation, relative to the actual packet length, of a packet length of a fourth scheduling packet received by the first network device after the to-be-scheduled packet is forwarded by the second network device.

In a possible embodiment, the access device in FIG. 4 may be a BRAS, the first network device may be a DSLAM, and the DSLAM device needs to use an internet protocol (Internet Protocol, IP) in an optical fiber access network and provide an Ethernet uplink interface. The DSLAM device that uses the IP protocol and provides the Ethernet uplink interface is referred to as an IP-DSLAM. The second network device is an aggregation device, such as an aggregation switch. In a scenario shown in FIG. 4, the first compensation value determined by the access device is 0, the second compensation value is 8, the third compensation value is 0, and the fourth compensation value is 4. This is because in an optical fiber access scenario, the aggregation switch accesses an 802.1Q in 802.1Q (802.1Q in 802.1Q, QINQ) interface of the access device (where 802.1Q is an Institute of Electrical and Electronics Engineers (Institute of Electrical and Electronics Engineers, IEEE) 802.1Q protocol). When the BRAS receives the to-be-scheduled packet and determines that the to-be-scheduled packet can be forwarded, the access device adds two layers of virtual local area network (virtual local area network, VLAN) tags to the to-be-scheduled packet, and then forwards the to-be-scheduled packet to the aggregation switch. An inner-layer tag and an outer-layer tag in the two layers of VLAN tags are each four bytes. If the actual packet length of the to-be-scheduled packet received by the BRAS is 240 bytes, a packet length of a second scheduling packet received by the aggregation switch after the to-be-scheduled packet is forwarded by the BRAS is 248 bytes, and an estimate of a variation relative to the actual packet length is 8. In other words, the second compensation value is 8. After receiving the to-be-scheduled packet forwarded by the BRAS, the aggregation switch strips out the four-byte outer-layer VLAN tag. Therefore, a packet length of a fourth scheduling packet received by the IP-DSLAM after the to-be-scheduled packet is forwarded by the aggregation switch is 244 bytes, and an estimate of a variation relative to the actual packet length is 4. In other words, the fourth compensation value is 4. After receiving the to-be-scheduled packet forwarded by the aggregation switch, the IP-DSLAM strips out the four-byte inner-layer VLAN tag. Therefore, a packet length of a first scheduling packet received by the user equipment after the to-be-scheduled packet is forwarded by the IP-DSLAM is 240 bytes, and an estimate of a variation relative to the actual packet length is 0. In other words, the second compensation value is 0. After receiving the to-be-scheduled packet, the user equipment stops processing the packet and directly distributes the packet to a corresponding target network service. Therefore, the third compensation value is also 0. It may be understood that the foregoing types of the first network device, the second network device, and the access device are merely used as examples, and cannot be understood as a specific limitation. For example, the IP-DSLAM may be alternatively an optical line terminal (optical line terminal, OLT).

In this embodiment of this application, the compensation value is determined based on a transmission protocol of each device in a network, and the compensation value may be positive, negative, or zero. For example, in the scenario shown in FIG. 4, because the BRAS uses the 802.ad protocol, the BRAS needs to add two layers of VLAN tags to the to-be-scheduled packet, and therefore, the second compensation value determined based on an identifier of the BRAS is 4. For another example, if a tunnel technology is used in the network to transmit data, a start node of a tunnel encapsulates an 18-byte frame header into user data based on a tunnel protocol, and then sends the user data to the user equipment by using the tunnel. If an actual packet length of a to-be-scheduled packet that is sent by using the tunnel technology and received by the BRAS is 240 bytes, and an end node of the tunnel is the user equipment, the user equipment deletes the encapsulated 18-byte frame header based on the tunnel protocol and then distributes the user data to a corresponding target network service. In other words, a length of a packet received by the target network service is 222 bytes, and a corresponding compensation value determined based on the identifier of the user equipment is −18. It may be understood that when a packet passes through each network device in a transmission process, modification of the packet by each network device is not completely the same. Modification of the packet by each network device includes but is not limited to any one or more of adding an interframe gap, adding a packet header, adding a packet preamble, adding a virtual local area network tag, deleting an interframe gap, deleting a packet header, deleting a packet preamble, or deleting a virtual local area network tag. Therefore, compensation values corresponding to the network devices are not completely the same. The compensation values in the foregoing embodiments are merely used as examples, and cannot be understood as a specific limitation.

Optionally, the compensation value is determined based on the transmission protocol used by each device in the network. However, for a specific broadband access network, each device uses a specific transmission protocol. Therefore, a compensation value or a compensation algorithm corresponding to each device is determined. After establishing the broadband access network, a network manager may configure an identifier of each device and a compensation value or a compensation algorithm corresponding to the identifier of each device in the access device. After receiving the to-be-scheduled packet, the access device needs to obtain only an identifier of each device on a forwarding path of the to-be-scheduled packet, and does not need to obtain a transmission protocol corresponding to each device on the forwarding path, to determine a compensation value or a compensation algorithm corresponding to each device on the forwarding path.

Figure 5:
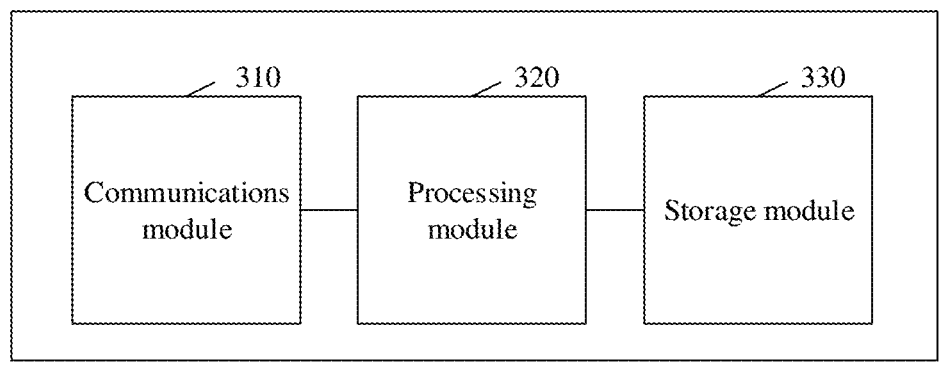
FIG. 5 is a schematic structural diagram of a packet scheduling apparatus according to an embodiment of this application.

Related network apparatuses in the embodiments of this application are described below with reference to related embodiments shown in FIG. 1 to FIG. 4. FIG. 5 shows a packet scheduling apparatus in a hierarchical bandwidth management system according to an embodiment of this application. The apparatus 300 includes a communications module 310, a processing module 320, and a storage module 330.

The processing module 320 may be configured to control and manage an action of the apparatus 300. For example, the processing module 320 is configured to perform step S104 and step S106 in FIG. 2 and/or other content of a technology described in the method embodiments of this application. The communications module 310 is configured to receive a packet sent by another device or send a packet to another device. For example, in step S108, when it is determined that the first quantity of target tokens is less than or equal to the first quantity of remaining tokens and the second quantity of target tokens is less than or equal to the second quantity of remaining tokens, the received packet is forwarded to the first network device.

The storage module 330 is configured to store program code and data, for example, storing a correspondence between a device identifier of each device and the compensation value or the compensation algorithm in the foregoing method embodiments. The processing module 320 finds, based on the correspondence, a compensation value or a compensation algorithm corresponding to each device identifier, and invokes, based on the compensation algorithm, the corresponding program code stored in the storage module 330, to calculate a compensation value corresponding to each device.

The processing module 320 may be a processor or a controller, for example, may be a central processing unit (central processing unit, CPU), a general-purpose processor, a digital signal processor (digital signal processing, DSP), an application-specific integrated circuit (application-specific integrated circuit, ASIC), a field programmable gate array (field programmable gate array, FPGA) or another programmable logical device, a transistor logical device, a hardware component, or any combination thereof. The processing module may be implement or execute various example logical blocks, modules, and circuits described with reference to content disclosed in this application. The processor may be alternatively a combination of processors implementing a computing function, for example, a combination of one or more microprocessors, or a combination of the DSP and a microprocessor. The communications module 310 may be a communications interface, a transceiver, a transceiver circuit, or the like. The communications interface is a general name, and may include one or more interfaces. The storage module 330 may be a memory, or another service or module configured to provide a storage function.

Specifically, for specific implementation in which the apparatus 300 performs various operations, refer to specific operations in the foregoing method embodiments. Details are not described herein.

Figure 6:
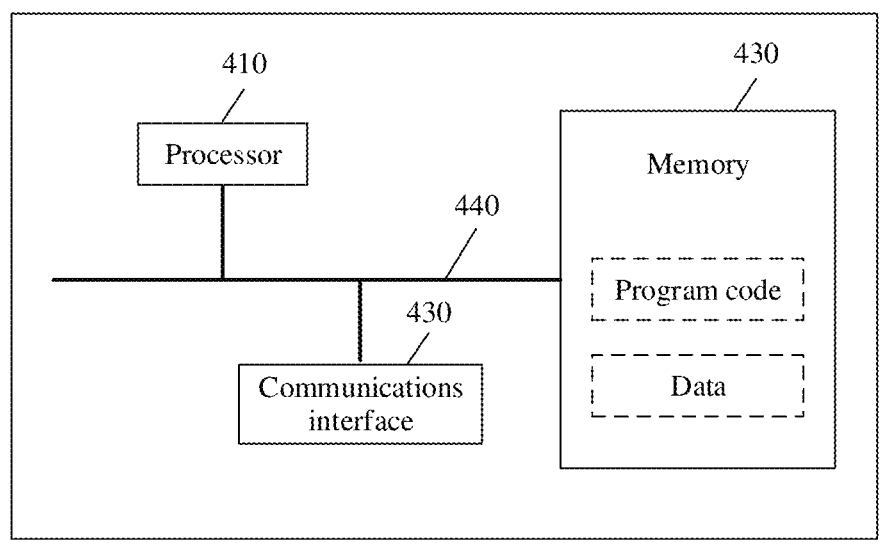
FIG. 6 is a schematic structural diagram of a packet scheduling device according to an embodiment of this application.

FIG. 6 is a schematic structural diagram of a network device according to an embodiment of this application. The network device 400 includes at least a processor 410, a communications interface 420, and a memory 430. The processor 410, the communications interface 420, and the memory 430 are connected to each other by using a bus 440.

The processor 410 may include one or more general purpose processors, such as a central processing unit (central processing unit, CPU) or a combination of a CPU and a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory 430 may include a volatile memory (volatile memory), such as a random access memory (random access memory, RAM). The memory may also include a non-volatile memory (non-volatile memory), such as a read-only memory (read-only memory, ROM), a flash memory (flash memory), a hard disk drive (hard disk drive, HDD), or a solid-state drive (solid-state drive, SSD). The memory 430 may further include a combination of the foregoing types of memories. The memory 430 may be configured to store program code and data, so that the processor 410 invokes the program code and the data that are stored in the memory 430, to implement functions of the communications module and/or the processing module in the embodiments of this application.

The processor 410 is configured to read a related instruction in the memory 430 to perform the following operations:

The processor 410 controls the communications interface to receive a to-be-scheduled packet, where the to-be-scheduled packet is a packet sent by a network side to user equipment.

The processor 410 obtains an actual packet length of the to-be-scheduled packet, where the actual packet length indicates a total length of the to-be-scheduled packet.

The processor 410 determines a first compensation value and a second compensation value based on the to-be-scheduled packet, where the first compensation value indicates an estimate of a variation relative to the actual packet length after the to-be-scheduled packet is forwarded by a first network device, the second compensation value indicates an estimate of a variation relative to the actual packet length after the to-be-scheduled packet is forwarded by the access device, and the first network device is a network device located between the access device and the user equipment on a forwarding path of the to-be-scheduled packet.

The processor 410 determines a first packet length and a second packet length, where a value of the first packet length is equal to a sum of a value of the actual packet length and the first compensation value, and a value of the second packet length is equal to a sum of the value of the actual packet length and the second compensation value.

The processor 410 schedules the to-be-scheduled packet based on the first packet length and the second packet length.

Specifically, for specific implementation in which the network device performs various operations, refer to specific operations in the foregoing method embodiments. Details are not described herein.

An embodiment of the present invention further provides a non-transient computer storage medium. The non-transient computer storage medium stores an instruction. When the instruction runs on a processor, method steps in the foregoing method embodiments may be implemented. For specific implementation of performing the method steps by the processor of the non-transient computer storage medium, refer to specific operations in the foregoing method embodiments. Details are not described herein.

All or some of the foregoing embodiments may be implemented by using software, hardware, or any combination thereof. When software is used for implementation, all or some of the embodiments may be implemented in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, an SSD).

Sequence adjustment, combination, or deletion may be performed on steps in the method in the embodiments of this application based on an actual requirement. The modules in the apparatus in the embodiments of this application may be divided, combined, or deleted based on the actual requirement.

The embodiments of this application are described in detail above. The principle and implementation of this application are described in this specification by using specific examples. The description about the embodiments of this application is merely provided to help understand the method and core ideas of this application. In addition, a person of ordinary skill in the art can make variations and modifications to this application in terms of the specific implementations and application scopes based on the ideas of this application. Therefore, content of this specification shall not be construed as a limitation to this application.

What is claimed is:

1. A packet scheduling method, comprising:
   receiving, by an access device, a to-be-scheduled packet, wherein the to-be-scheduled packet is a packet sent by a network side to user equipment;
   obtaining, by the access device, an actual packet length of the to-be-scheduled packet, wherein the actual packet length indicates a total length of the to-be-scheduled packet;
   determining, by the access device, a first compensation value and a second compensation value based on the to-be-scheduled packet, wherein the first compensation value indicates an estimate of a variation relative to the actual packet length after the to-be-scheduled packet is forwarded by a first network device, the second compensation value indicates an estimate of a variation relative to the actual packet length after the to-be-scheduled packet is forwarded by the access device, and the first network device is a network device located between the access device and the user equipment on a forwarding path of the to-be-scheduled packet;
   determining, by the access device, a first packet length and a second packet length, wherein a value of the first packet length is equal to a sum of a value of the actual packet length and the first compensation value, and a value of the second packet length is equal to a sum of the value of the actual packet length and the second compensation value; and
   scheduling, by the access device, the to-be-scheduled packet based on the first packet length and the second packet length,
   wherein the first network device is a network device that is based on an asynchronous transfer mode (ATM), and the first compensation value is equal to a length value of an ATM cell header times a quotient of the value of the actual packet length and a value of an ATM cell length.

2. The method according to claim 1, wherein the determining, by the access device, a first compensation value and a second compensation value based on the to-be-scheduled packet specifically comprises:
   determining, by the access device, the forwarding path of the to-be-scheduled packet based on the to-be-scheduled packet, wherein the forwarding path comprises an identifier of the access device and an identifier of the first network device; and
   determining, by the access device, the first compensation value based on the identifier of the first network device, and determining the second compensation value based on the identifier of the access device.

3. The method according to claim 2, wherein the determining, by the access device, the first compensation value based on the identifier of the first network device, and determining the second compensation value based on the identifier of the access device specifically comprises:
   determining, by the access device, a first compensation algorithm based on the identifier of the first network device, and determining a second compensation algorithm based on the identifier of the access device, wherein the first compensation algorithm is used to compensate for a packet length of a packet forwarded by the first network device, and the second compensation algorithm is used to compensate for a packet length of a packet forwarded by the access device; and
   determining, by the access device, the first compensation value based on the actual packet length and the first compensation algorithm, and determining the second compensation value based on the actual packet length and the second compensation algorithm.

4. The method according to claim 1, wherein the scheduling, by the access device, the to-be-scheduled packet based on the first packet length and the second packet length specifically comprises:
   obtaining, by the access device, a first quantity of remaining tokens in a first token bucket corresponding to the user equipment, wherein the first quantity of remaining tokens is equal to a quantity of tokens in the first token bucket at a current moment;
   obtaining, by the access device, a second quantity of remaining tokens in a second token bucket corresponding to the first network device, wherein the second quantity of remaining tokens is equal to a quantity of tokens in the second token bucket at the current moment;
   determining, by the access device, a first quantity of target tokens used to schedule the to-be-scheduled packet based on the first token bucket and the first packet length, and a second quantity of target tokens used to schedule the to-be-scheduled packet based on the second token bucket and the second packet length;
   determining, by the access device, whether the first quantity of target tokens is less than or equal to the first quantity of remaining tokens, and whether the second quantity of target tokens is less than or equal to the second quantity of remaining tokens; and
   when the access device determines that the first quantity of target tokens is less than or equal to the first quantity of remaining tokens and the second quantity of target tokens is less than or equal to the second quantity of remaining tokens, determining, by the access device, to forward the to-be-scheduled packet in a first period, deducting, from the first token bucket, tokens that are in a same quantity as the first quantity of target tokens, and deducting, from the second token bucket, tokens that are in a same quantity as the second quantity of target tokens.

5. The method according to claim 4, wherein the method further comprises:
   when the access device determines that the first quantity of target tokens is greater than the first quantity of remaining tokens, or the second quantity of target tokens is greater than the second quantity of remaining tokens, determining, by the access device, not to forward the to-be-scheduled packet in the first period.

6. The method according to claim 1, wherein
   access bandwidth of the user equipment is total bandwidth accessed to the user equipment, the access bandwidth of the user equipment comprises first bandwidth, the first bandwidth is used to indicate bandwidth accessed to a target network service of the user equipment, a value of the first bandwidth is less than a value of the access bandwidth of the user equipment, and the method further comprises:

determining, by the access device, an identifier of the user equipment, and determining a third compensation value based on the identifier of the user equipment, wherein the third compensation value indicates an estimate of a variation relative to the actual packet length after the to-be-scheduled packet is distributed by the user equipment to the target network service; and the scheduling, by the access device, the to-be-scheduled packet based on the first packet length and the second packet length specifically comprises:

determining, by the access device, a third packet length based on the actual packet length and the third compensation value, wherein a value of the third packet length is equal to a sum of the value of the actual packet length and the third compensation value; and scheduling, by the access device, the to-be-scheduled packet based on the first packet length, the second packet length, and the third packet length.

7. The method according to claim 6, wherein the scheduling, by the access device, the to-be-scheduled packet based on the first packet length, the second packet length, and the third packet length specifically comprises:

obtaining, by the access device, a first quantity of remaining tokens in a first token bucket corresponding to the user equipment, wherein the first quantity of remaining tokens is equal to a quantity of tokens in the first token bucket at a current moment;

obtaining, by the access device, a second quantity of remaining tokens in a second token bucket corresponding to the first network device, wherein the second quantity of remaining tokens is equal to a quantity of tokens in the second token bucket at the current moment;

obtaining, by the access device, a third quantity of remaining tokens in a third token bucket corresponding to the target network service, wherein the third quantity of remaining tokens is equal to a quantity of tokens in the third token bucket at the current moment;

determining, by the access device, a first quantity of target tokens used to schedule the to-be-scheduled packet based on the first token bucket and the first packet length, a second quantity of target tokens used to schedule the to-be-scheduled packet based on the second token bucket and the second packet length, and a third quantity of target tokens used to schedule the to-be-scheduled packet based on the third token bucket and the third packet length;

determining, by the access device, whether the first quantity of target tokens is less than or equal to the first quantity of remaining tokens, whether the second quantity of target tokens is less than or equal to the second quantity of remaining tokens, and whether the third quantity of target tokens is less than or equal to the third quantity of remaining tokens; and when the access device determines that the first quantity of target tokens is less than or equal to the first quantity of remaining tokens, the second quantity of target tokens is less than or equal to the second quantity of remaining tokens, and the third quantity of target tokens is less than or equal to the third quantity of remaining tokens, determining, by the access device, to forward the to-be-scheduled packet, deducting, from the first token bucket, tokens that are in a same quantity as the first quantity of target tokens, deducting, from the second token bucket, tokens that are in a same quantity as the second quantity of target tokens, and deducting, from the third token bucket, tokens that are in a same quantity as the third quantity of target tokens.

8. The method according to claim 6, wherein the determining a third compensation value based on the identifier of the user equipment specifically comprises:

determining, by the access device, a third compensation algorithm based on the identifier of the user equipment, and determining the third compensation value based on the actual packet length and the third compensation algorithm.

9. A packet compensation apparatus, comprising:
a non-transitory memory storing instructions; and
a processor coupled to the non-transitory memory; wherein the instructions, when executed by the processor, cause the apparatus to be configured to:
receive a to-be-scheduled packet, wherein the to-be-scheduled packet is a packet sent by a network side to user equipment; and
obtain an actual packet length of the to-be-scheduled packet, wherein the actual packet length indicates a total length of the to-be-scheduled packet, wherein
determine a first compensation value and a second compensation value based on the to-be-scheduled packet, wherein the first compensation value indicates an estimate of a variation relative to the actual packet length after the to-be-scheduled packet is forwarded by a first network device, the second compensation value indicates an estimate of a variation relative to the actual packet length after the to-be-scheduled packet is forwarded by the receiver, and the first network device is a network device located between the packet compensation apparatus and the user equipment on a forwarding path of the to-be-scheduled packet; and
determine a first packet length and a second packet length, wherein a value of the first packet length is equal to a sum of a value of the actual packet length and the first compensation value, and a value of the second packet length is equal to a sum of the value of the actual packet length and the second compensation value; and schedule the to-be-scheduled packet based on the first packet length and the second packet length,
wherein the first network device is a network device that is based on an asynchronous transfer mode (ATM), and the first compensation value is equal to a length value of an ATM cell header times a quotient of the value of the actual packet length and a value of an ATM cell length.

10. The apparatus according to claim 9, wherein the instructions, when executed by the processor, further cause the apparatus to be configured to:

determine the forwarding path of the to-be-scheduled packet based on the to-be-scheduled packet, wherein the forwarding path comprises an identifier of the packet compensation apparatus and an identifier of the first network device; and determine the first compensation value based on the identifier of the first network device, and determine the second compensation value based on the identifier of the packet compensation apparatus.

11. The apparatus according to claim 10, wherein the instructions, when executed by the processor, further cause the apparatus to be configured to:

determine a first compensation algorithm based on the identifier of the first network device, and determine a second compensation algorithm based on the identifier of the packet compensation apparatus, wherein the first compensation algorithm is used to compensate for a packet length of a packet forwarded by the first network device, and the second compensation algorithm is used to compensate for a packet length of a packet forwarded by the packet compensation apparatus; and determine the first compensation value based on the actual packet length and the first compensation algorithm, and determine the second compensation value based on the actual packet length and the second compensation algorithm.

12. The apparatus according to claim 9, wherein that the instructions, when executed by the processor, further cause the apparatus to be configured to:

obtain a first quantity of remaining tokens in a first token bucket corresponding to the user equipment, wherein the first quantity of remaining tokens is equal to a quantity of tokens in the first token bucket at a current moment;

obtain a second quantity of remaining tokens in a second token bucket corresponding to the first network device, wherein the second quantity of remaining tokens is equal to a quantity of tokens in the second token bucket at the current moment;

determine a first quantity of target tokens used to schedule the to-be-scheduled packet based on the first token bucket and the first packet length, and a second quantity of target tokens used to schedule the to-be-scheduled packet based on the second token bucket and the second packet length;

determine whether the first quantity of target tokens is less than or equal to the first quantity of remaining tokens, and whether the second quantity of target tokens is less than or equal to the second quantity of remaining tokens; and when the apparatus determines that the first quantity of target tokens is less than or equal to the first quantity of remaining tokens and the second quantity of target tokens is less than or equal to the second quantity of remaining tokens, determine to forward the to-be-scheduled packet in a first period, deduct, from the first token bucket, tokens that are in a same quantity as the first quantity of target tokens, and deduct, from the second token bucket, tokens that are in a same quantity as the second quantity of target tokens.

13. The apparatus according to claim 12, wherein the instructions, when executed by the processor, further cause the apparatus to be configured to:

when the apparatus determines that the first quantity of target tokens is greater than the first quantity of remaining tokens, or the second quantity of target tokens is greater than the second quantity of remaining tokens, determine not to forward the to-be-scheduled packet in a first period.

14. The apparatus according to claim 9, wherein access bandwidth of the user equipment is total bandwidth accessed to the user equipment, the access bandwidth of the user equipment comprises first bandwidth, the first bandwidth is used to indicate bandwidth accessed to a target network service of the user equipment, a value of the first bandwidth is less than a value of the access bandwidth of the user equipment, the instructions, when executed by the processor, further cause the apparatus to be configured to:

determine an identifier of the user equipment, and determine a third compensation value based on the identifier of the user equipment, wherein the third compensation value indicates an estimate of a variation relative to the actual packet length after the to-be-scheduled packet is distributed by the user equipment to the target network service; and determine a third packet length based on the actual packet length and the third compensation value, wherein a value of the third packet length is equal to a sum of the value of the actual packet length and the third compensation value; and schedule the to-be-scheduled packet based on the first packet length, the second packet length, and the third packet length.

15. The apparatus according to claim 14, wherein the instructions, when executed by the processor, further cause the apparatus to be configured to:

obtain a first quantity of remaining tokens in a first token bucket corresponding to the user equipment, wherein the first quantity of remaining tokens is equal to a quantity of tokens in the first token bucket at a current moment;

obtain a second quantity of remaining tokens in a second token bucket corresponding to the first network device, wherein the second quantity of remaining tokens is equal to a quantity of tokens in the second token bucket at the current moment;

obtain a third quantity of remaining tokens in a third token bucket corresponding to the target network service, wherein the third quantity of remaining tokens is equal to a quantity of tokens in the third token bucket at the current moment;

determine a first quantity of target tokens used to schedule the to-be-scheduled packet based on the first token bucket and the first packet length, a second quantity of target tokens used to schedule the to-be-scheduled packet based on the second token bucket and the second packet length, and a third quantity of target tokens used to schedule the to-be-scheduled packet based on the third token bucket and the third packet length;

determine whether the first quantity of target tokens is less than or equal to the first quantity of remaining tokens, whether the second quantity of target tokens is less than or equal to the second quantity of remaining tokens, and whether the third quantity of target tokens is less than or equal to the third quantity of remaining tokens; and when the apparatus determines that the first quantity of target tokens is less than or equal to the first quantity of remaining tokens, the second quantity of target tokens is less than or equal to the second quantity of remaining tokens, and the third quantity of target tokens is less than or equal to the third quantity of remaining tokens, determine to forward the to-be-scheduled packet, deduct, from the first token bucket, tokens that are in a same quantity as the first quantity of target tokens, deduct, from the second token bucket, tokens that are in a same quantity as the second quantity of target tokens, and deduct, from the third token bucket, tokens that are in a same quantity as the third quantity of target tokens.

16. The apparatus according to claim 14, wherein the instructions, when executed by the processor, further cause the apparatus to be configured to:

determine a third compensation algorithm based on the identifier of the user equipment, and determine the third compensation value based on the actual packet length and the third compensation algorithm.

17. A packet scheduling method, comprising:
receiving, by an access device, a to-be-scheduled packet, wherein the to-be-scheduled packet is a packet sent by a network side to user equipment;
obtaining, by the access device, an actual packet length of the to-be-scheduled packet, wherein the actual packet length indicates a total length of the to-be-scheduled packet;
determining, by the access device, a first compensation value and a second compensation value based on the to-be-scheduled packet, wherein the first compensation value indicates an estimate of a variation relative to the actual packet length after the to-be-scheduled packet is forwarded by a first network device, the second compensation value indicates an estimate of a variation relative to the actual packet length after the to-be-scheduled packet is forwarded by the access device, and the first network device is a network device located between the access device and the user equipment on a forwarding path of the to-be-scheduled packet;
determining, by the access device, a first packet length and a second packet length, wherein a value of the first packet length is equal to a sum of a value of the actual packet length and the first compensation value, and a value of the second packet length is equal to a sum of the value of the actual packet length and the second compensation value; and
scheduling, by the access device, the to-be-scheduled packet based on the first packet length and the second packet length,
wherein
access bandwidth of the user equipment is total bandwidth accessed to the user equipment, the access bandwidth of the user equipment comprises first bandwidth, the first bandwidth is used to indicate bandwidth accessed to a target network service of the user equipment, a value of the first bandwidth is less than a value of the access bandwidth of the user equipment, and the method further comprises:
determining, by the access device, an identifier of the user equipment, and determining a third compensation value based on the identifier of the user equipment, wherein the third compensation value indicates an estimate of a variation relative to the actual packet length after the to-be-scheduled packet is distributed by the user equipment to the target network service; and
the scheduling, by the access device, the to-be-scheduled packet based on the first packet length and the second packet length specifically comprises:
determining, by the access device, a third packet length based on the actual packet length and the third compensation value, wherein a value of the third packet length is equal to a sum of the value of the actual packet length and the third compensation value; and scheduling, by the access device, the to-be-scheduled packet based on the first packet length, the second packet length, and the third packet length.

18. The method according to claim 17, wherein the scheduling, by the access device, the to-be-scheduled packet based on the first packet length and the second packet length specifically comprises:
obtaining, by the access device, a first quantity of remaining tokens in a first token bucket corresponding to the user equipment, wherein the first quantity of remaining tokens is equal to a quantity of tokens in the first token bucket at a current moment;
obtaining, by the access device, a second quantity of remaining tokens in a second token bucket corresponding to the first network device, wherein the second quantity of remaining tokens is equal to a quantity of tokens in the second token bucket at the current moment;
determining, by the access device, a first quantity of target tokens used to schedule the to-be-scheduled packet based on the first token bucket and the first packet length, and a second quantity of target tokens used to schedule the to-be-scheduled packet based on the second token bucket and the second packet length;
determining, by the access device, whether the first quantity of target tokens is less than or equal to the first quantity of remaining tokens, and whether the second quantity of target tokens is less than or equal to the second quantity of remaining tokens; and
when the access device determines that the first quantity of target tokens is less than or equal to the first quantity of remaining tokens and the second quantity of target tokens is less than or equal to the second quantity of remaining tokens, determining, by the access device, to forward the to-be-scheduled packet in a first period, deducting, from the first token bucket, tokens that are in a same quantity as the first quantity of target tokens, and deducting, from the second token bucket, tokens that are in a same quantity as the second quantity of target tokens.

19. The method according to claim 18, wherein the method further comprises:
when the access device determines that the first quantity of target tokens is greater than the first quantity of remaining tokens, or the second quantity of target tokens is greater than the second quantity of remaining tokens, determining, by the access device, not to forward the to-be-scheduled packet in the first period.

20. The method according to claim 17, wherein the determining a third compensation value based on the identifier of the user equipment comprises:
determining, by the access device, a third compensation algorithm based on the identifier of the user equipment, and determining the third compensation value based on the actual packet length and the third compensation algorithm.

* * * * *